United States Patent [19]

Grau et al.

[11] 4,394,574

[45] Jul. 19, 1983

[54] METHODS AND APPARATUS FOR CONSTITUENT ANALYSIS OF EARTH FORMATIONS

[75] Inventors: James A. Grau, Ridgefield, Conn.; Russel C. Hertzog, Missouri City, Tex.

[73] Assignee: Schlumberger Technology Corporation, New York, N.Y.

[21] Appl. No.: 187,123

[22] Filed: Sep. 15, 1980

Related U.S. Application Data

[63] Continuation of Ser. No. 65,244, Aug. 9, 1979, abandoned.

[51] Int. Cl.³ .............................................. G01V 5/00
[52] U.S. Cl. .................................... 250/262; 250/269; 250/270
[58] Field of Search ....................... 250/262, 269, 270

[56] References Cited

U.S. PATENT DOCUMENTS 3,521,064 7/1970 Moran et al. ................... 250/269 X 3,842,265 10/1974 Pitts, Jr. ............................. 250/270

FOREIGN PATENT DOCUMENTS 1408808 10/1975 United Kingdom .

Primary Examiner—Davis L. Willis
Attorney, Agent, or Firm—Stephen L. Borst; David P. Gordon

[57] ABSTRACT

The composition of a geological formation traversed by a borehole is investigated by measuring an energy spectrum of the radiation within the borehole. The measured spectrum is thereafter analyzed by comparing it with a composite spectrum, made up of standard spectra of constituents postulated to comprise the formation-borehole system. As a result of such analysis, the proportions of the postulated constituents in the formation are determined. Where the measured spectrum is subject to degradation due to changes in the resolution of the detector, a filtering arrangement effects modification of the standard spectra in a manner which provides for a more accurate determination of the constituents of the borehole-formation system.

22 Claims, 3 Drawing Figures

4,394,574

METHODS AND APPARATUS FOR CONSTITUENT ANALYSIS OF EARTH FORMATIONS

RELATED APPLICATIONS

This is a continuing application of the prior, copending U.S. application Ser. No. 065,244 filed Aug. 9, 1979, and now abandoned the benefit of the filing date of which is hereby claimed.

BACKGROUND OF THE INVENTION

1. Field of Invention

The present invention relates in general to nuclear well logging, the pertains in particular to improved methods and apparatus for analyzing radiation energy spectra to provide more accurate information of the constituents of a geological formation-borehole system.

2. The Prior Art

Heretofore, various techniques have been utilized to process gamma ray energy spectra for formation constituent analysis. In the case of inelastic scattering gamma ray energy spectra, it is known that analysis of the spectra to identify the contributions thereto due to carbon and oxygen provides useful information of the presence of oil in a formation. Additional information concerning the composition of the formation, such as its lithology for instance, is however frequently required before an unambiguous determination of the presence of oil can be made. A suitable lithology indicator for this purpose might comprise the ratio of inelastic scattering gamma ray contributions for calcium and silicon.

The derivation of the foregoing information concerning carbon, oxygen, calcium and silicon, and possibly other constituents of the formation, depends upon accurate constituent analysis of the formation gamma ray spectra. An important and basic technique for performing such analysis is disclosed in U.S. Pat. No. 3,521,064, issued on July 21, 1970 to Moran, et al. In accordance with the Moran et al teaching, a detected gamma ray energy spectrum for a formation of unknown composition is compared with a composite spectrum made up of weighted standard spectra of the constituents postulated to comprise the formation. The weight coefficients for the standard spectra which give the best fit of the composite spectrum to the unknown spectrum, as determined, for example, by the method of least squares, represent the relative proportions of the constituents in the formation. By appropriate selection of the standard spectra, the proportions of the constituents of interest, such as carbon, oxygen, calcium, silicon, etc., may be obtained, from which the desired information regarding oil content may be derived.

It has further been proposed in U.S. application Ser. No. 869,584, filed Jan. 16, 1978, for R. C. Hertzog et al, and assigned to the assignee of the present application, the disclosure of which is hereby incorporated by reference, that a background energy spectrum be generated from gamma rays detected during periods between neutron bursts and be utilized to provide one or more standard background spectra for use in the analysis of the inelastic scattering gamma ray spectra. The standard background spectra is then updated on a repetitive basis to reflect the current background component in the detected inelastic scattering gamma ray spectrum. The measured inelastic spectrum is thereafter analyzed by comparing it with a composite spectrum, made up of standard spectra of constituents, including the background spectra, postulated to comprise the formation, to determine the proportions in the formation of the postulated constituents.

The spectral standards, except for a background standard, as employed in the aforementioned Hertzog, et al application are generated illustratively, in known laboratory formations or test pits at standard conditions of temperature, pressure and detector resolution. The measured spectrum, on the other hand, is obtained in borehole wells having temperatures which vary from borehole to borehole as well as along the length of any one borehole. As a result of such temperature variations and the age of the detector crystal, the output of gamma-ray detectors employed in obtaining the measured spectrum is subject to variation and deterioration in resolution. For example, where a sodium iodide (NaI) detector is employed, the spectral resolution of the output is known to deteriorate (peak width increase) from a measured seven percent peak full width at half maximum (0.662 Mev) at 20° C. (room temperature) to over ten percent peak full width at half maximum at 150° C.

Since the derivation of the foregoing information concerning constituents of the formation, depends upon accurate constituent analysis of the formation gamma ray spectra, the weight coefficients for the standard spectra which give the best fit of the composite spectrum to the unknown spectrum, e.g., as determined in accordance with the Moran, et al technique, will not, in effect, represent the relative proportions of the constituents in the formation if detector resolution is significantly different from the resolution of the standard spectra.

SUMMARY OF THE INVENTION

In accordance with principles of the present invention, a system and method for analysis of the constituents of a geological formation-borehole system is proposed. In order to improve the match between the measured spectrum and a composite spectrum comprising a plurality of standard spectra, the standard spectra are compensated for differences between the spectral resolution extant during a logging run and the spectral resolution associated with the standard spectra.

In further accordance with principles of the present invention, advantage is taken of the Gaussian distribution shape of known peaks in the spectrum measured by a radiation detector to effect the generation of a filter operator that describes a time and temperature induced increase in the detector resolution as a function of the energy of the incident radiation. The filter operator is employed to effect a modification of the standard spectra so as to generate a new set of reference spectra which are normalized to a detector resolution state similar to that of the measured spectra. This filter operator is readily generated to accommodate a large variety of detector resolution states and easily effects normalization for all conditions of detector resolution variance to provide for a more accurate result of the analysis.

In accordance with one embodiment of the present invention, a detected radiant energy spectrum, measured by a detector of unknown resolution in a formation-borehole system of unknown composition is compared with a composite spectrum made up of weighted standard spectra of constituents postulated to comprise the formation-borehole system. The weight coefficients for the standard spectra which give the best fit, i.e., reduce the fit discrepancy of the composite spectrum to the measured spectrum, as determined, for example, by the method of least squares, provide one measre of the relative proportions of the constituents of the formation. A filter operator representing the effects of detector resolution degradation on an obtained spectrum is thereafter employed to provide a new set of standard spectra which are modified to reflect detector resolution changes. This new set of spectra is then employed in the constituent analysis process to provide yet another set of weight coefficients for the modified standard spectra as a measure of the relative proportions of the constituents of the formation-borehole system. This process is further repeated until a set of weight coefficients for a particular modification of the standard spectra is found which give the best fit of the composite spectrum to the measured spectrum. This set of the weight coefficients represents a measure of the relative proportions of the constituents in the formation-borehole system which is adjusted for variations in detector resolution between the measured spectrum and the standard spectra. The above-described technique relative to the search for the optimum filter operator is hereafter referred to as a minimum chi-square search.

Before describing in greater detail additional aspects of the invention, it is instructive to generally discuss the underlying theory upon which the spectral fitting analysis is based in order to define the weighted least squares technique as used in practicing the invention.

Each spectrum, inelastic, backgroun, or capture, obtained with a multichannel analyzer, is recorded as a histogram. The abscissa is the energy axis which is divided into m equal-width energy intervals. (For typical NaI(T1)-detector resolution, m=256 is sufficient.) The ordinate for the ith energy interval is the number of gamma-rays ($n_i$) accumulated for that energy interval in the preferred embodiment. All spectra are represented as m-dimensional vectors, p. The components, $p_i$, of each vector are normalized such that the sum of the $p_i$'s is unity.

In general a formation spectrum, p, can be described as a linear combination of a complete set of s standard descriptor spectra, $p^j$ (j=1, 2, . . . ,s). Each of these standard spectra may correspond to an element expected to be present in the formation.

The vectors for the standard spectra are mathematically represented by column vectors of an m by s spectra-descriptor matrix, $\rho$, such that $$P = \sum_{j=1}^{s} P^j X_j = \rho \cdot X \tag{1}$$

where x is a vector whose components are the spectroscopic-yield coefficients, $X_j$. Each $X_j$ represents the fractional contribution from the corresponding standard spectrum-descriptor vector, $P^j$, to the total measured spectrum, p. The most significant spectral-response functions required for the background-corrected inelastic spectra are those for the elements C, O, Ca, Si, Fe, Cl, and for the capture spectra are for elements, H, Si, Cl, Ca, Fe, and activation background.

The general problem of spectroscopy-logging analysis is to determine the yield coefficients, $X_j$, which represent the contribution of each element to the observed spectrum. Since matrix $\rho$ is not square (because m>s), it is not possible in general to invert $\rho$ in order to solve for X. Also, the measured spectrum, p, contains statistical errors which can be represented by including an error spectrum, $\epsilon$, in Eq. 1, $$P = \sum_{j=1}^{s} P^j X_j + \epsilon = \rho \cdot X + \epsilon \tag{2}$$

By selecting a suitable positive symmetric weighting matrix, W, for example, the variance covariance matrix of the observed spectrum p, the weighted statistical error squared is $$\epsilon^T W \epsilon = (P - \rho \cdot X)^T W (P - \epsilon \cdot X) \tag{3}$$

where $\epsilon^T$ is the transpose of $\epsilon$, and $\epsilon^T W \epsilon$ is a number which measures the overall error. The weighted-least-squares solution which minimizes the error in Eq. 3 is given by $$X = (\rho^T W \rho)^{-1} \rho^T W \cdot P \tag{4}$$

The choice of the weighting matrix determines the nature of the least-squares estimate. In order to avoid lengthy matrix inversions for each analysis, the estimate used for W is based on a typical spectrum.

Eq. 4 can be rewritten in the form $$X = E \cdot P \tag{5}$$

where $$E = (\rho^T W \rho)^{-1} \rho^T W \tag{6}$$

The matrix, E, consists of s row vectors, $E^j$, each associated with one of the elemental standard descriptor spectra, $p^j$. The vectors, $E^j$, are called linear estimators because the scalar product between the observed spectrum, p, and each of the vectors, $E^j$, gives the fractional contribution, or yield, $X_j$, of the jth element to the observed spectrum.

To generate the set of standard spectra, $P^j$, for use in the descriptor matrix, $\rho$, inelastic and capture spectra are taken in special laboratory formations designed to emphasize the spectral contribution of each given element.

As discussed above, each standard leads to the generation of an associated linear estimator, $E^j$ whose shape reflects the character of the standard and the cross correlations between it and other standards. Thus, the estimator is a type of digital filter that extracts from the observed spectrum, p, the contribution from its associated standard spectrum. For example, both the carbon and oxygen estimators have large positive components where there are peaks in the corresponding standard spectra. The estimators also have negative components. This occurs where a standard anti-correlates with one or more other standards since the estimator for a standard is derived such that it is as independent as possible from estimators for other standards.

In accordance with yet another embodiment of the present invention, the appropriate filter operator, described by a linear combination of coefficients associated with respective monotonically increasing functions of the energy of the incident radiation, may be determined by examining only two of the coefficients. The first coefficient is associated with a term which has no energy dependence and the second coefficient is associated with a term having a dependence corresponding to the square of the incident radiant energy. An initial filter operator is determined by varying only the first coefficient and performing a minimum chi-square search for the optimum filter operator over a low energy portion of the measured spectrum. This initial filter operator is thereafter finalized by varying the second coefficient and performing yet another minimum chi-square search for the optimum filter operator over a high energy portion of the measured spectrum. During this second search, care is taken to insure that the finalized filter operator provides the same or similar modification result for the standard spectra over their low energy portions as the initial version of the filter operator.

In accordance with yet another embodiment of the present invention, a filter operator generated for the analysis of a particular measured spectrum is employed for the analysis of subsequent measured spectra over an interval of the well borehole where changes in temperatures do not exceed certain limits. Where changes in temperature exceeding the certain limits are detected during spectrum measurement, a new filter operator is generated so as to improve the accuracy of the formation-borehole system constituent analysis.

BRIEF DESCRIPTION OF THE DRAWINGS

The present invention may be better understood and its numerous objects and advantages will become apparent to those skilled in the art by reference to the accompanying drawings in which.

DETAILED DESCRIPTION

Figure 1:
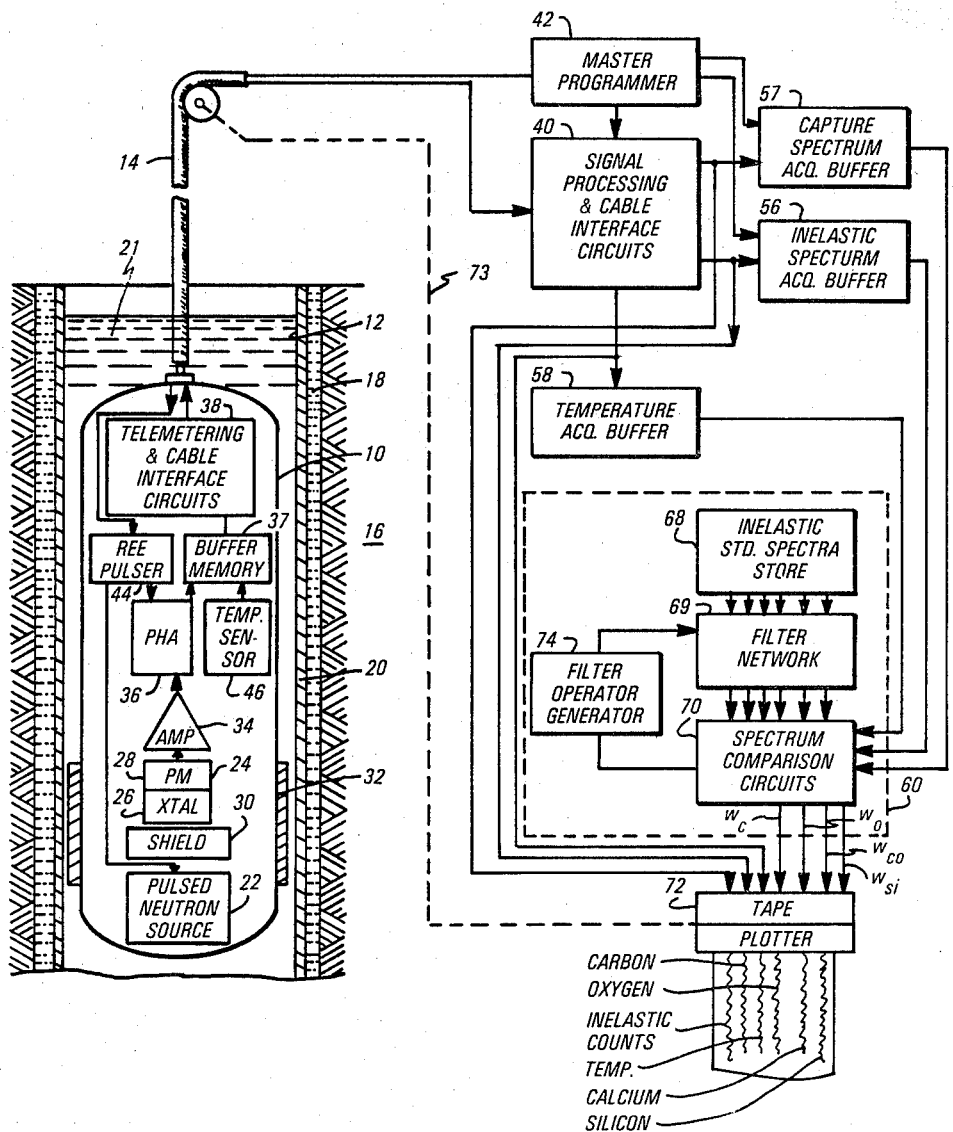
FIG. 1, is a schematic view of an embodiment of logging apparatus constructed in accordance with the present invention.

While the invention is susceptible of various modifications and alternative constructions, there is shown in the drawings and there will hereinafter be described, in detail, a description of the preferred or best known mode of the invention. It is to be understood, however, that the specific description and drawings are not intended to limit the invention to the specific form disclosed. On the contrary, it is intended that the scope of this patent include all modifications and alternative constructions thereof falling within the spirit and scope of the invention as expressed in the appended claims, to the full range of their equivalents.

In the drawing of FIG. 1, a representative embodiment of the invention includes a fluid-tight, pressure and temperature resistant well tool or sonde 10 that is adapted to be suspended in a well bore 12 by an armored cable 14 for investigating a subsurface earth formation 16. The well bore 12 is illustrated as cased, including the usual annulus of cement 18 and steel casing 20, and as containing a well fluid 21. Although no tubing is shown in the well bore, the tool if desired may be sized for through-tubing use. It will be understood that the invention has application also to open hole logging.

In one embodiment, sonde 10 includes a pulsed neutron source 22 and a radiation detector 24. The neutron source 22 is preferably of the accelerator type described in U.S. Pat. Nos. 3,461,291 to C. Goodman and 3,546,512 to A. H. Frentrop, both of which are commonly owned with this application. This type of neutron source is particularly adapted to generate discrete bursts of high energy or fast neutrons, e.g. at 14 MeV, of controlled duration and repetition rate. It should be recognized however, that in another embodiment the sonde 10 may lack a neutron source 22 so that the energy spectra obtained are due entirely to the naturally radioactive elements in the formation-borehole system.

The detector 24 of the preferred embodiment may be of any construction appropriate to the detection, illustratively, of gamma rays and to the production of a pulse signal in response to each detected gamma ray having an amplitude representative of the energy detected gamma ray. Generally, such a detector includes a scintillation crystal 26 which is optically coupled to a photomultiplier tube 28. The crystal is preferably of the thallium-activated sodium iodide type, though other suitable crystal types such as thallium sodium-activated cesium iodide, may be used. Alternatively, a solid state detector, having for example a germanium crystal, might be employed. A neutron shield 30 may be positioned between the source 22 and the detector 24 to reduce bombardment of the detector by neutrons emanating directly from the source.

Electrical power for the sonde 10 is supplied through the cable 14 from a source of power (not shown) at the surface. Suitable power sources (not shown) are also included in the sonde 10 for the purpose of driving the neutron source 22, the detector 24 and other downhole electronics. The sonde 10 may be surrounded by a boron-carbide-impregnated sleeve 32 located generally in the region of the source 22 and detector 24. The sleeve 32 acts as a shield to minimize the detection of gamma radiation originating from neutron interactions in the immediate vicinity of the source and detector.

An amplifier 34 acts on the output pulses from the photomultiplier 28. The amplified photomultiplier pulses are thereafter applied to a pulse height analyzer (PHA) 36, which may be of any conventional type such as a single ramp (Wilkinson rundown) type. It will be understood to include the usual pulse height discriminators, for selection of the gamma ray energy range to be analyzed, and linear gating circuits, for control of the time portion of the detector signal train to be analyzed.

PHA 36 segregates the detector pulses into predetermined channels according to their amplitude and supplies signals in suitable digital form representing the amplitude of each analyzed pulse. The digital outputs of PHA 36 are stored in a buffer memory 37 and then transferred to telemetering and cable interface circuits 38 for transmission over cable 14 to the surface. At the surface, the cable signals are received by signal processing and cable interface circuits 40. It will be understood that the circuits 38 and 40 may be of any suitable known construction for encoding and decoding, multiplexing and demultiplexing, amplifying and otherwise processing the signals for transmission to and reception by the uphole electronics. Appropriate circuits are described, for example, in U.S. Pat. No. 4,012,712, issued Mar. 15, 1977 to William B Nelligan for "System for Telemetering Well Logging Data".

The operation of the sonde 10 is controlled by signals sent downhole from a master programmer 42 located at the surface. These signals are received by a reference pulser 44 which, in response thereto, transmits control signals to the neutron source 22 and to the PHA 36.

Upon receipt of the reference pulses, the pulsing circuit generates a sharp fire pulse thereby causing the source 22 to emit a corresponding sharp burst of fast neutrons. For purposes of constituent analysis of inelastic scattering gamma ray spectra in accordance with the present invention, the neutron bursts are preferably of short duration, e.g. 18 microseconds, and are repeated at short intervals, e.g. every 100 microseconds, so as to provide satisfactory statistics in the spectrum analysis procedure.

The control signals transmitted from the reference pulser 44 to the PHA 36 enable the linear gating circuits of the PHA during at least two different time intervals in relation to each neutron burst: a first interval, an inelastic gate substantially coincident with the respective neutron bursts and the second interval, a capture gate at a time between neutron bursts.

The detector pulses applied to the PHA 36 during the inelastic gate correspond predominantly to inelastic scattering gamma rays and the detector pulses applied to the PHA 36 during the capture gate correspond predominately to gamma rays resulting from neutron interactions other than inelastic scattering interactions. For the high-burst-rate timing sequence usually employed the detector pulses generated during the capture gate will include components due to gamma rays produced by (1) thermal neutron capture of neutrons from preceding bursts and by (2) capture neutrons which are generated in the borehole environment by the slowing fast neutrons.

The sonde 10 further includes a temperature sensor 46 which may be of any construction appropriate to the detection of borehole temperatures and to the production of an output signal representative of such temperature. Advantageously, such sensor 46 supplies its output signal in suitable digital form to telemetering and interface circuits 38 for transmission over cable 14 to the surface.

The inelastic scattering gamma ray spectrum and the neutron capture background gamma ray spectrum are generated by data acquisition buffers 56 and 57, respectively, which, under the control of the master programmer 42, accumulate the appropriate counts-per-channel signals from the signal processing and cable interface circuits 40. Specifically, the inelastic spectrum acquisition buffer 56 accumulates the inelastic scattering gamma ray counts-per-channel signals for a period long enough to give a statistically satisfactory spectrum, e.g. on the order of 18 microseconds, and is then instructed by the master programmer 42 to output the spectrum, recycle to zero, and accumulate a new spectrum for a like period. Similarly, the capture spectrum acquisition buffer 57 accumulates the capture gamma counts-per-channel data for a specified period.

It will be appreciated, therefore, that the background spectrum is repetitively updated as the sonde 10 is moved through the well bore, and thus automatically takes into account variations in such factors as sonde environment, sonde performance, source strength and the like which affect the shape of the capture spectrum.

A temperature acquisition buffer 58, also under the control of the master programmer 43, accumulates the temperature data from the signal processing and cable interface circuits 40. Desirably, the temperature data is accumulated on a continuous basis during the inelastic spectrum accumulation process and an average value associated with each measured inelastic spectrum provided as an output.

Following accumulation in the acquisition buffers 56, 57 and 58, the inelastic scattering spectrum, the capture spectrum and the average temperature value are transferred to storage buffers (not shown) in a circuit arrangement 60. The arrangement 60 may comprise a general purpose digital computer, such as the PDP-11 computer manufactured by the Digital Equipment Corporation, Maynard, Mass., or, alternatively, it may comprise an analog computer. In either event, it will be understood that the arrangement 60 is suitably constructed to perform the spectrum matching and constituent proportions determining functions described in the Moran, et al. U.S. Pat. No. 3,521,064. In addition, the arrangement 60 includes circuits capable of carrying out certain spectrum processing and pre-analysis steps, as described hereinafter, preparatory to the analysis of the inelastic scattering spectrum.

Within the arrangement 60, storage buffers 68 provide output signals representing the previously obtained standard spectra which are applied, through a filter network 69, to the spectrum comparison circuits 70 for comparison with the inelastic scattering spectrum in the manner of the Moran, et al. patent 3,521,064. In addition to being used as background for the inelastic spectral analysis, the capture spectrum may be first applied to spectrum processing circuits for selectively carrying out a number of operations on the capture spectrum signals as described in the aforementioned Hertzog, et al. application.

As described in the Moran, et al. U.S. Pat. No. 3,521,064, the signals representing the unknown inelastic scattering gamma ray spectrum, as accumulated in acquisition buffer 56, are compared with signals representing the weighted standard inelastic spectra to determine the proportions of the constituents which provide the combination, i.e. the composite spectrum, which most nearly matches the unknown inelastic scattering spectrum. This comparison is made in the spectrum comparison circuits 70. Preferably, the "least squares" criterion is used to determine when a best fit has been obtained between the composite spectrum and the unknown spectrum. The weights ($w_i$) for the respective standard spectra which produce the best fit represent the proportions of the corresponding constituents in the formation. As indicated in the drawing, the comparison circuits 70 generate the constituents weights ($w_i$) and transmit signals representative thereof to a recorder 72. The recorder 72 includes the conventional visual and magnetic tape components for making the customary record of logging signals as a function of depth. The usual cable-following mechanical linkage 73 for driving the recorder 72 in synchronism with the cable 14 is provided for this purpose. Advantageously, suitable ratios of such constituent weights, e.g. the carbon/oxygen ratio and the calcium/silicon ratio, may be formed and recorded as a function of tool depth. The output signals from the signal processing and cable interface circuits 40 may also be recorded directly on tape in the manner indicated in the drawing for further processing and review.

In order to better understand the principles of the present invention represented in the accompanying drawing, detector resolution and factors affecting it will be presently examined in some detail.

The peak-full-width-at-half-maximum resolution (R) of a detector response at a given energy (E) and temperature (T) can be generally expressed as:

$$R(E,T)^2 = A_0(T) + A_1(T)E + A_2(T)E^2 + \ldots + A_n(T)E^n \quad (7)$$

where the coefficients $A_i$ are temperature dependent parameters that describe the detector resolution dependence on the incident gamma ray energy E. For any one particular detector, the coefficients $A_i$ will also be dependent on the degradation of the resolution due to the age of the detector crystal. It will be appreciated that for a typical, undamaged detector at room temperature, only the first two terms of equation (7) will contribute significantly to the expression describing detector resolution.

Equation (7) provides a general expression for detector resolution with temperature dependency. The resolution of a given spectrum measured for example at $T_o$ can be expressed as $R(E,T_o)$. It will be appreciated, however, that this expression of resolution becomes inadequate in describing detector resolution at other temperatures which differ significantly from $T_o$. Therefore, to derive an expression of detector resolutions at temperatures which differ significantly from $T_o$, some filtering process which reflects the changes in resolution becomes desirable.

In the practices of the present invention, advantage is taken of the general Gaussian shape of the peaks of a detector measured spectrum to effect a convolution of the spectrum obtained at $T_o$ by a Gaussian of resolution $G(E,T)$ to produce a new spectrum at the new temperature (T) with a resolution given by the expression:

$$R(E,T)^2 = R(E,T_o)^2 + G(E,T)^2 \quad (8)$$

$$\text{where } G(E,T)^2 = G_0(T) + G_1(T)E + G_2(T)E^2 + \ldots + G_n(T)E^n \quad (9)$$

and the coefficients $G_i$ are temperature dependent.

Therefore, given a set of standard spectra measured by a detector and having respective spectra obtained at $T_o$ by a detector having an output spectrum resolution expressed as $R(E,T_o)$, one is able to effect a modification of those spectra for any temperature condition through a filtering process which effects a Gaussian convolution of the obtained spectra. Of course, a determination of the appropriate values of the coefficients, which parameterize the filter operator, $G_i$ becomes essential for effecting the desired modification.

The energy spectrum of any one of the standard spectra exists in a digital or analog computer as 256 contiguous channels, with the particular shape of the spectrum defined by the counts stored in locations corresponding to respective channels. This spectrum can be effectively degraded (i.e., broadened), by convoluting a broadening function with the stored spectrum. The broadening function is generally of the form $$F(\Delta E, E, T) = EXP\{(-2.77 \Delta E^2)/G(E,T)^2\} \quad (10)$$

Where $\Delta E$ is a variable energy interval defined over an integral number of contiguous spectral channels.

The new, broadened spectrum is obtained from the following relationship:

$$S_{new} = \left( \sum_{\Delta E} S_{old}(E + \Delta E) F(\Delta E, E, T) \right) / \left( \sum_{\Delta E} F(\Delta E, E, T) \right) \quad (11)$$

Where $S_{new}(E)$ is the new average count rate in a spectral channel centered about the energy E;

$S_{old}(E+\Delta E)$ is the average count rate of the existing spectrum, in a spectral channel centered about the energy $E+\Delta E$; and $\Delta E$ is an integral multiple of the channel width. The sum over $\Delta E$ in equation (11) includes all $\Delta E$ values for which $F(\Delta E,E,T)$ is greater than a given limit, such as 0.1.

With reference again to the drawing, circuit arrangement 60 represents one embodiment of the present invention. For purposes of illustration we may assume that a detected radiant energy spectrum conveyed from inelastic spectrum buffer 56 to spectrum comparison circuit 70 is to be analyzed for the formation constituents contributing thereto. We will further assume that this spectrum is measured by a detector of unknown resolution and at a given temperature T as provided to the spectrum comparison circuits 70 by the temperature acquisition buffer 58. Since this is an initial analysis of the measured spectrum, we may further assume that the filter operator generator 74 is in a reset state and therefore provides an output to filter network 69 such that the standard spectra provided from the inelastic standard spectra store 68 through filter network 69 to spectra comparison circuits 70 undergo no modification. In comparison circuits 70 the measured spectrum is compared with a composite spectrum made up of weighted standard spectra, as provided from the inelastic standard spectra store 68, of constituents postulated to comprise the formation. The weight coefficients ($w_i$) for the standard spectra which give the best fit, i.e. reduce the fit discrepancy of the composite spectrum to the measured spectrum, as determined, for example, by the method of least squares, provide one measure of the relative proportions of the constituents of the formation. It will be appreciated of course that one may then obtain a difference indication corresponding to the fit discrepancy between the measured spectrum and the composite spectrum. If the difference indication is not optimal an output of the spectrum comparison circuits 70 is applied to the filter operator generator 74 so as to generate a filter operator representing the effects of detector resolution degradation on an obtained spectrum. The generation of this filter operator will be subsequently discussed in more detail. For purposes of the present discussion, it will be sufficient to note that the output of filter operator generator 74 when applied to filter network 69 effects a modification of the standard spectra passing through the filter network from the inelastic standard spectra store 68 to the spectrum comparison circuits 70. It will be appreciated therefore that after the generation of the operator, spectrum comparison circuits 70 will receive a new set of standard spectra which are modified to reflect detector resolution changes. This new set of spectra is then employed, in spectrum comparison circuits 70, in the constituent analysis process to provide yet another set of weight coefficients for the modified standard spectra as a measure of their relative proportions of the constituents of the formation. A difference indication between this new composite spectrum and the measured spectrum can then be obtained. It will be appreciated then that this process, of generating modified standard spectra is further repeated until a set of weight coefficients for a particular modification of the standard spectra is found which gives the best fit of the composite spectrum to the measured spectrum, i.e. until the difference indication for that particular set of standard spectra is minimized. This set of weight coefficients then represents a measure of the relative proportions of the constituents in the formation which is adjusted for variations in detector resolutions between the measured spectrum and the standard spectra. These weight coefficients are thereafter provided as an output from the spectrum comparison circuits and applied to the recorder 72.

As discussed above, the degradation in resolution of a spectrum measured by a crystal is dependent on the energy of the incident radiation; i.e., the degradation response is dependent on energy. Furthermore, this energy dependency is not fixed for any one crystal but is further subject to variations as a function of temperature and the age of the crystal. It will be appreciated, therefore, that knowledge of a particular energy dependency of the resolution of a crystal at a given temperature and time in the life of the crystal, is of little use when either the temperature or the age of the crystal changes. Therefore, it is incumbent, for a more accurate analysis of formation constituents, in accordance with the Moran practices, that spectral shapes of the standard spectra reflect a detector resolution which is relatively close to the detector resolution extant when the measured spectrum is obtained.

Filter operator coefficients $G_i$, which in effect determine the extent of spectral broadening and the energy dependence of such broadening, may be generally determined by sequentially, upon a command from the spectrum comparison circuits to the filter operator generator 74, changing one of the filter operator coefficients while holding the other of the filter operator coefficients constant and performing a minimum chi-square search for the optimum filter operator set which reduces the difference between the measured spectrum and a composite spectrum formed of weighted, modified standard spectra. Obviously, this process is relatively time consuming since it depends on the sequential changing of the operator and often requires that the whole process be repeated until the difference between the measured spectrum and the best modified composite spectrum is minimized. This process will have to be further repeated for significant changes in temperatures to which the detector is subjected during measurement intervals in which the radiation spectrum is obtained.

Once the optimum filter operator is obtained, it will be appreciated that, for a given temperature range, for example +5° C., the same filter operator will effect the desired normalizations of the spectral standards with respect to the measured spectrum. Should the sonde temperature, as communicated by buffer 58, during a measurement interval exceed the temperature range of the previously determined filter operator, a new operator is generated by the above mentioned process. Basically, the spectrum comparison circuits 70 include means for determining an initial temperature range and for modifying that temperature range whenever the temperature at which a new spectrum is measured differs from the limits set for that range. Once a new spectrum is measured at a temperature $T_2$ which differs from the limits previously defined, e.g., $T_1+5°$ C., $T_1-5°$ C., the spectrum comparison circuits 70 provide an output to the filter operator generator to effect generation of a new filter operator which will effect, in network 69, the desired "normalization" between the measured spectrum and the standard spectra. This operator remains unchanged for all subsequent spectra measured at temperatures T which are within the limits $T_2+5°$ C., $T_2-5°$ C.

In order to avoid the time consuming process of determining filter operators for the normalization process outlined above, the appropriate fiter operator, which provides the desired normalization of the standard spectra, may be determined by examining only two of the filter operator coefficients. For example, a first one not associated with any energy dependence and a second one associated with a term corresponding to the square of the incident gamma ray energy. An initial filter operator which modifies the standard spectra is determined by varying only the first coefficient and performing a minimum chi-square search for the optimum filter operator over a low energy portion or window of the measured spectrum. This initial filter operator is thereafter finalized by varying the second coefficient and performing yet another minimum chi-square search for the optimum filter operator over a high energy portion of the measured spectrum. During this second search operation care is taken to ensure that the finalized filter operator provides the same or similar modification result for the standard spectra over the low energy portion of the spectrum as did the initial filter operator. These low and high windows have width of the order of 30 and 80 channels respectively and are therefore small relative to the width of the whole measured spectrum.

The optimum filter operator generated for the analysis of a particular measured spectrum is, thereafter, employed for the analysis of subsequent measured spectra over an interval of the well borehole where changes in temperature do not exceed certain limits. Where changes in temperature exceeding the certain limits are detected during spectrum measurement, a new filter operator is generated, as discussed above, so as to improve the accuracy of the earth formation constituent analysis process.

Figure 2:
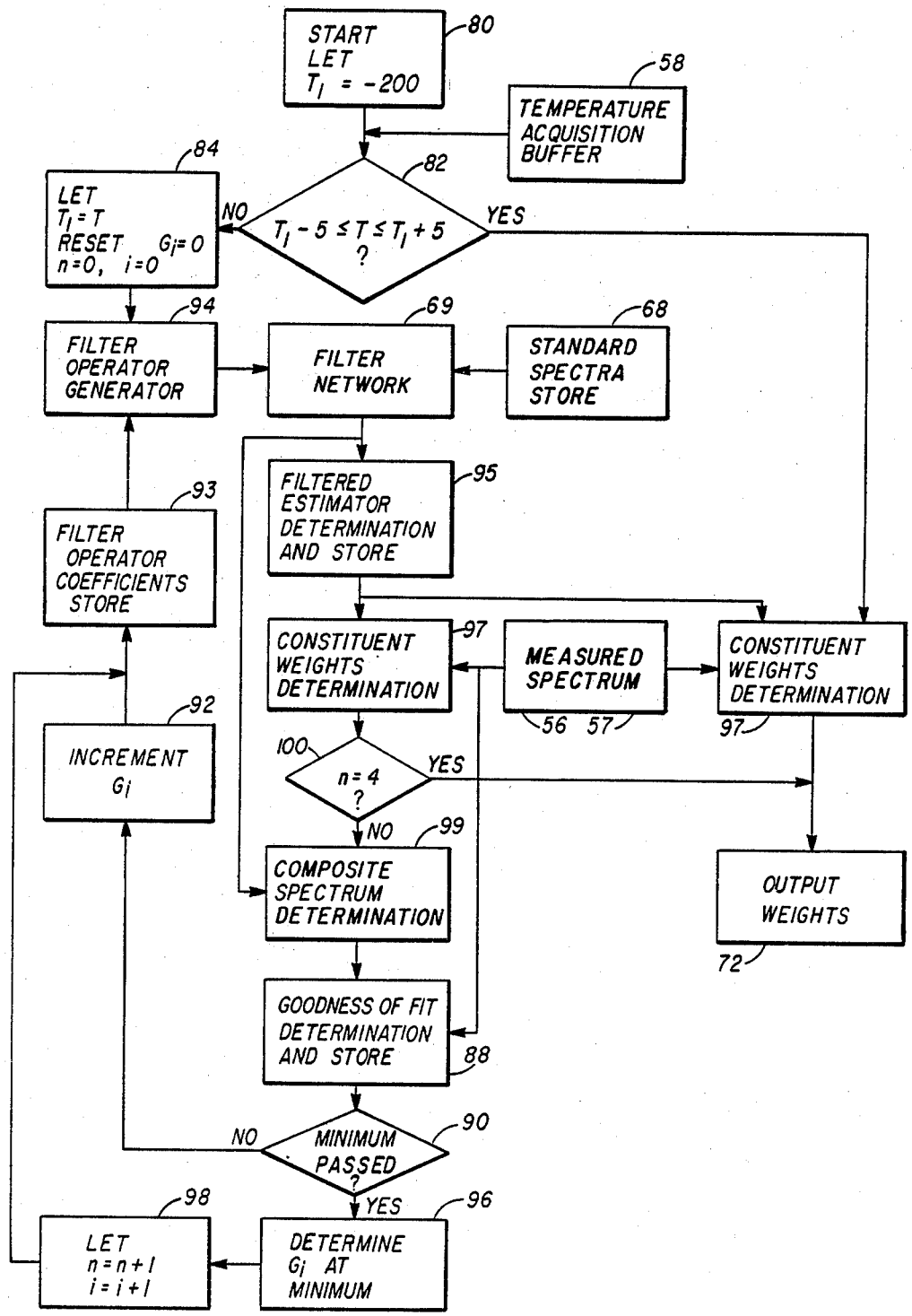
FIG. 2, is a simplified flow chart useful in the programming of a circuit arrangement in the embodiment of FIG. 1.

With reference now to FIG. 2, a simplified flow diagram is shown as illustrative of the operations performed within arrangement 60, in accordance with one embodiment of the present invention. These operations consist of two major paths. A first path reflects the search for filter operator coefficients, $G_0, G_1, G_2 \ldots$ etc. which provide for a minimum chi-square fitting of a modified composite spectrum to a measured spectrum. Included within the first path is a weighted least squares process for determining the filtered estimators from the filtered standards. The second path, which bypasses the first path wherever certain temperature conditions are met, uses estimators previously generated by the first path to determine the appropriate constituent weights.

At the start of operations at 80, it will be appreciated that values for the filter operators correspond to zeros so that operations of filter network 69 will effect no modification of the standard spectra. Also an initial temperature $T_1$, illustratively $-200°$ C., is chosen so as to assure that the first cycle of operations is conducted through the first path. Therefore, when at 82 the temperature T of the borehole at a given depth corresponding to that at which a measured spectrum is obtained is compared to a range of temperatures, $T_1-5°$ C. to $T_1+5°$ C., it will clearly fall without that range. The following step at 84 designates $T_1$ equal to T and resets all filter operator coefficients $G_i$, variables i and n equal to zero. Variable i is the subscript of the filter operator and identifies the correspondence of the coefficient to an incident energy term E which is raised to the power i. The variable n corresponds to the total number of coefficients to be considered, it being appreciated that the term n may be as large as is desired even though in practice only the first three terms $G_o$, $G_1$ and $G_2$ significantly contribute to the spectra modification process. The filtering process at 69 operates on the standard spectra from store 68, which in this initial cycle will pass through the filtering process unmodified. Subsequently, filtered estimators will be generated at 95 from the filtered standards by the weighted least squares process discussed above and constituent weights will be determined at 97 by combining the estimators with the measured spectrum. At 99 a composite spectrum is generated as a linear combination of the constituent weights with the filtered standards. Thereafter, at 88 a measure of the goodness of fit between the composite and measured spectra is derived and stored along with the filter operator coefficient subject to variation, in this case $G_o$. At 90, the goodness of fit derived at 88 is observed to determine whether or not it has passed through a minimum. Since this is the first cycle of operation, the filter operators generator will incrementally change $G_i$, i.e., in this case $G_o$, at 92, store this value at 93, generate a "new" filter operator at 94, and apply the "new" set of operators to filter 69. Of course, this time around when the standard spectra from store 68 are convoluted in filter 69 so as to be modified in accordance with the filter operator, the result of least squares fitting at 95, 97 and 99, and the goodness of fit measured at 88 will be different from that previously obtained.

Once the goodness of fit measure passes through a minimum, that minimum is determined at 96 by means of well known techniques such as by fitting a parabola through the points defining the path through the minimum and then determining the minimum of the parabola. The $G_o$ associated with such minimum is then stored at 93. Then n and i are incremented at 98 and the process is sequentially repeated through the first path for $G_1$, and $G_2$ and these values stored at 93. It will be appreciated that when n equals 4 this will signify that all the operators needed for the filtering process have been determined. Thereafter at 100 the search is terminated and the resolution-corrected constituent weights are supplied to a recorder or plotter such as 72 in FIG. 1.

For subsequent measured spectra having associated temperatures T within +5° C. of the previous measured spectrum, it may be safely assumed that the already determined filter operator will provide the desired modification of the standard spectra. Therefore, the process bypasses the first path and uses the previously determined filtered estimators to determine the constituent weights at 97. It will be appreciated that in this case the process bypasses not only the search for the optimal filter operator but also the weighted least squares determination of the estimators. Where the temperature of the measured spectrum exceeds that of the previously determined limits, the filter operator will have to be determined anew by the method outlined above with reference to the first path.

Figure 3:
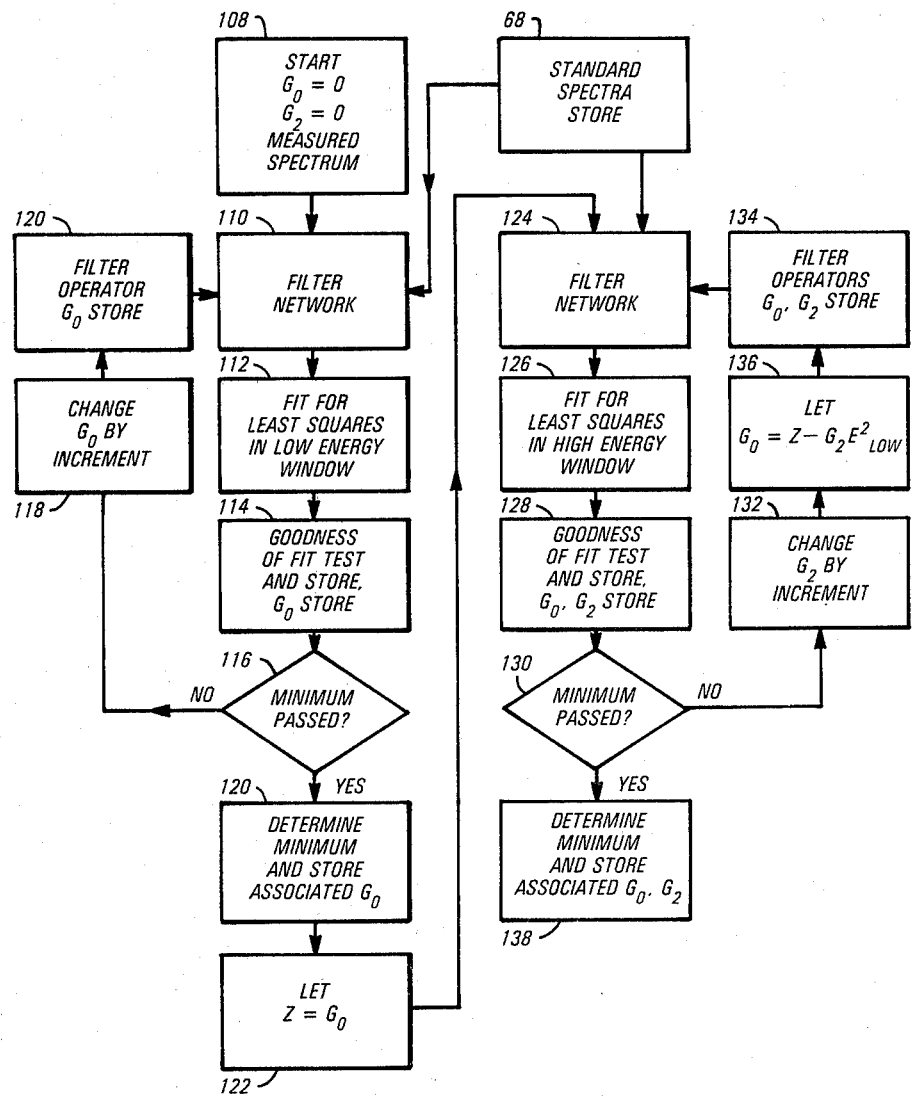
FIG. 3, is a simplified flow chart useful in the programming of a circuit arrangement in connection with the embodiment of FIG. 1.

With reference now to FIG. 3, a simplified flow diagram illustrates yet another embodiment of the present invention which simplifies the process of obtaining the optimum filter operator, i.e., the first path illustrated in FIG. 2, which would effect that desired modification of the standard spectra. In this embodiment only portions of the measured spectrum are employed in the determination of the operator, mainly a low energy window from 1.59 MeV to 2.55 MeV and a high energy window from 5.73 MeV to 7.33 MeV. Moreover, in accordance with this embodiment not all of the operator coefficients need be determined. Illustratively, only two operator coefficients $G_o$ and $G_2$ or $G_o$ and $G_1$, may be sufficient for effecting the desired modification of the standard spectra. Of course, more than two coefficients may be needed and this illustration of the embodiment of the invention is not intended to limit the practice of the invention to any selection of operator coefficients. We will assume, for purposes of illustration, that the two operator coefficients to be determined are $G_o$ and $G_2$. Initially at 108 $G_o$ and $G_2$ are set equal to zero so as not to effect any modification of the standard spectra when such spectra are convoluted in filter network 110. At 112 the portion of the spectrum in the low energy window is compared with a composite spectrum formed of weighted spectra of constituents postulated to have contributed to the measured spectrum. Thereafter, at 114 a measure of the goodness of fit between the measured spectrum and the composite spectrum is determined and stored along with the associated $G_o$. At 116 this measure of the goodness of fit is monitored for indications that it has passed through a minimum. If it has not passed through a minimum $G_o$ is incrementally changed at 118 and the new value stored at 120 where it is supplied to filter network 110. This process is repeated, as discussed with reference to FIG. 2, until the measure of the goodness of fit passes through a minimum. This minimum is then determined at 120 as previously discussed and a quantity Z is set equal to $G_o$ at 122. The process is then repeated for the determination of $G_2$ in the high energy window of the measured spectrum. Filter network 124, the least squares fitting step at 126, the measure goodness of fit derivation at 128, the passage through a minimum test at 130, the incremental changes of $G_2$ at 132 and the filter operator coefficient stored at 134, correspond to their counterparts discussed in reference to the determination of $G_o$ and will not be further discussed. However, it will be appreciated that since the desired filter operator should provide the same or similar modification of the standard spectra for the low energy window as the $G_o$ determined at 120, i.e., Z, a new $G_o$ is determined at 136 from the relationship:

$$G_o = Z = G_2 E^2_{Low}$$

Where $E_{Low}$ is the energy at the mid point of the low energy window.

Once a $G_2$ has been determined, i.e., the $G_2$ associated with a goodness of fit measure which is at a minimum, the associated $G_o$ will also be readily identified. This filter operator may then be stored at 138 and further employed in the determination of the formation constituents in accordance with the process discussed above and shown in the second path of FIG. 2.

Although the invention has been described herein with reference to a specific embodiment, many modifications and variations therein will readily occur to those skilled in the art. For example, the gamma ray energy spectrum analysis of the present invention may be carried out by comparison of gamma ray spectra obtained in other ways than by inelastic scattering of fast neutrons, such as those produced by thermal or epithermal neutron capture, or by other ways than by neutron irradiation such as natural gamma ray spectra. Accordingly, all such variations and modifications are included within the intended scope of the invention as defined by the following claims.

What is claimed is:

1. A method for investigating a geological system, which includes a geological formation traversed by a well bore, through comparison of a measured spectrum, generated by means including a radiation detector, with standard spectra having a given resolution, said method comprising the steps of:
   (a) modifying said standard spectra to reduce the effect of the difference between the detector resolution extant during the detection of said measured spectrum and the given resolution of said standard spectra, to generate modified standard spectra; and
   (b) comparing said modified standard spectra and said measured spectrum to derive information relative to the earth formation.

2. A method for determining a characteristic of a system comprising a geological formation traversed by a well borehole, said method comprising the steps of:
   (a) determining at least one standard energy spectrum having a given resolution;
   (b) measuring by means including a detector in said borehole, an energy spectrum of radiation;
   (c) modifying said standard spectrum in a manner which reduces the effect of the difference between the detector resolution extant during said measuring step and the given resolution of said standard energy spectrum; and
   (d) comparing said measuring spectrum and the modified standard spectrum to determine a characteristic of the formation.

3. The method of claims 1 or 2 wherein said modifying step comprises the steps of:
   (a) generating a filter operator and modifying at least one standard spectrum by said filter operator so as to provide a modified standard spectrum;
   (b) assembling a composite spectrum, one component of which comprises said modified standard spectrum;
   (c) deriving a difference indication corresponding to the fit discrepancy between the measured spectrum and the composite spectrum;
   (d) repeating said generating step, said assembling step, and said deriving step for a plurality of different filter operators to identify an optimum filter operator associated with a minimum difference indication.

4. The method of claim 1 further comprising the steps of:
   (a) obtaining an indication of temperature associated with the measurement of said measured spectrum; and
   (b) repeating said modifying step only where said obtained temperature indication differs from an indication of temperature associated with a precedent measured spectrum by more than a chosen value.

5. The method of claim 2 further comprising the steps of:
   (a) obtaining an indication of temperature associated with the measurement of said measured spectrum; and
   (b) repeating said modifying step only where said obtained temperature indication differs from an indication of temperature associated with a precedent measured spectrum by more than a chosen value.

6. The method of claim 3 further comprising the steps of:
   (a) obtaining an indication of temperature associated with the measurement of said measured spectrum; and
   (b) repeating said generating, assembling, deriving and repeating steps only where said obtained temperature indication differs from an indication of temperature associated with a precedent measured spectrum by more than a chosen value.

7. The method of claim 3 wherein said deriving step effects a comparison of said composite spectrum and said measured spectrum over spaced-apart portions of the spectrum, which portions are small in width relative to the width of the measured spectrum.

8. The method of claim 1 or 2 wherein said modifying step comprises the steps of:
   (a) generating a filter operator having an energy independent portion and a portion dependent on the square of the energy, wherein an initial version of said filter operator is generated by varying only the coefficient of said energy independent portion of said operator and performing a first chi-square minimization search for the optimum filter operator for the low energy portion of the measured spectrum, and a final version of said filter operator is generated by varying the coefficient of said energy dependent portion of said operator and performing a second chi-square minimization search for the optimum filter operator for a high energy portion of the measured spectrum, wherein the coefficient of the energy independent portion concurrently varies as a determined function of said varying coefficient of the energy dependent portion such that said final filter operator is constrained to provide the same result over the low energy portion of the spectrum as said initial filter operator version; and
   (b) modifying said standard spectrum by said filter operator as to provide a modified standard spectrum.

9. The method of claim 8 further comprising the steps of:
   (a) obtaining an indication of temperature associated with the measurement of said measured spectrum; and
   (b) repeating said modifying step only where said obtained temperature indication differs from an indication of temperature associated with a precedent measured spectrum by more than a chosen value.

10. A method for investigating the composition of an earth formation traversed by a well bore through comparison of a measured spectrum of detected radiation, resulting from interactions between incident radiation and constituents of the formation, with a composite spectrum made of weighted standard spectra of constituents postulated to have contributed to said measured spectrum, comprising the steps of:
    (a) generating a filter operator and modifying said standard spectrum by said filter operator so as to provide a modified standard spectrum;

(b) assembling a composite spectrum, one component of which comprises said modified standard spectrum;

(c) deriving a difference indication corresponding to the fit discrepancy between the measured spectrum and the composite spectrum;

(d) repeating said generating step, said assembling step, and said deriving step for a plurality of different filter operators to identify an optimum filter operator associated with a minimum difference indication.

11. The method of claim 10 wherein said filter operator includes only two portions, one not associated with any energy dependency and the other associated with a term corresponding to the square of the energy of the incident radiation.

12. The method of claims 10 or 11 wherein said deriving step effects a comparison of said composite spectrum and said measured spectrum over spaced-apart portions of the spectrum which portions are small in width relative to the width of the measured spectrum.

13. The method of claim 12 wherein said deriving step effects comparison of said composite spectrum with said measured spectrum over at least two portions of the spectrum which are respectively located in a high energy and a low energy region of the spectrum.

14. The method of claim 10 further comprising the steps of:
(a) obtaining an indication of temperature associated with the measurement of said measured spectrum; and
(b) repeating said assembling, deriving and repeating steps only where said obtained temperature indication differs from an indication of temperature associated with a precedent measured spectrum by more than a chosen value.

15. The method of claim 11 further comprising the steps of:
(a) obtaining an indication of temperature associated with the measurement of said measured spectrum; and
(b) repeating said assembling, deriving and repeating steps only where said obtained temperature indication differs from an indication of temperature associated with a precedent measured spectrum by more than a chosen value.

16. The method of claim 12 further comprising the steps of:
(a) obtaining an indication of temperature associated with the measurement of said measured spectrum; and
(b) repeating said generating, assembling, deriving and repeating steps only where said obtained temperature indication differs from an indication of temperature associated with a precedent measured spectrum by more than a chosen value.

17. An apparatus for investigating an earth formation traversed by a well bore through comparison of a measured spectrum, generated by means including a radiation detector, with standard spectra having a given resolution, said apparatus comprising:
(a) means for modifying said standard spectra to reduce the effect of the difference between the detector resolution extant during the detection of said measured spectrum and the given resolution of said standard spectra, to generate modified standard spectra; and (b) comparison means for comparing said modified standard spectra and said measured spectrum to derive information relative to the earth formation.

18. The apparatus of claim 17 wherein said apparatus comprises:
(a) a filter for generating a filter operator and for filtering said standard spectrum by said filter operator so as to provide a modified standard spectrum;
(b) means for assembling a composite spectrum, one component of which comprises said modified standard spectrum;
(c) means for deriving a difference indication corresponding to the fit discrepancy between the measured spectrum and the composite spectrum;
(d) feedback means for causing said filter, said assembling means, and said difference indication deriving means to repeat their respective functions for a plurality of different filter operators until an optimum filter operator associated with a minimum difference indication has been identified.

19. The apparatus of claim 17 further comprising:
(a) a transducer for obtaining an indication of temperature associated with the measurement of said measured spectrum; and
(b) enablement means for enabling said standard spectra modifying means only where said temperature transducer indicates a temperature different from a previous temperature associated with a precedent measured spectrum by more than a chosen value.

20. The apparatus of claim 18 wherein said means for deriving includes means for comparing said composite spectrum and said measured spectrum over spaced-apart portions of the spectrum, which portions are small in width relative to the width of the measured spectrum.

21. The apparatus of claim 17 wherein said means for modifying comprises:
(a) means for generating a filter operator having an energy independent portion and a portion dependent on the square of the energy, wherein an initial version of said filter operator is generated by varying only the coefficient of said energy independent portion of said operator and performing a first chi-square minimization search for the optimum filter operator for the low energy portion of the measured spectrum, and a final version of said filter operator is generated by varying the coefficient of said energy dependent portion of said operator and performing a second chi-square minimization search for the optimum filter operator for a high energy portion of the measured spectrum, wherein the coefficient of the energy independent portion concurrently varies as a determined function of said varying coefficient of the energy dependent portion such that said final filter operator is constrained to provide the same result over the low energy portion of the spectrum as said initial filter operator version; and
(b) means for modifying said standard spectrum by said filter operator as to provide a modified standard spectrum.

22. The apparatus of claim 21 further comprising:
(a) a transducer for obtaining an indication of temperature associated with the measurement of said measured spectrum; and
(b) enablement means for enabling said standard spectra modifying means only where said temperature transducer indicates a temperature different from a previous temperature associated with a precedent measured spectrum by more than a chosen value.

* * * * *